Patented Jan. 14, 1941

2,228,455

UNITED STATES PATENT OFFICE 2,228,455

VAT DYESTUFFS

Ernst Honold and Max Schubert, Frankfort-on-the-Main-Fechenheim, Germany, assignors to General Aniline & Film Corporation, a corporation of Delaware No Drawing. Application September 14, 1937, Serial No. 163,748. In Germany September 16, 1936

4 Claims. (Cl. 260—205)

This invention relates to vat dyestuffs, more particularly to those of the general formula:

[X—A—X₁]—[—CO—NH—R₁]ₙ wherein X and X₁ stand for members selected from the group consisting of radicles of the benzene, naphthalene, diphenyl, fluorene, diphenylene oxide, diphenylene sulfide, carbazole and benzthiazole series, A stands for a member selected from the group consisting of the azo and azoxy group, R₁ stands for a radicle of a vattable ring system containing an anthraquinone radical and n stands for one of the numbers 2 to 4.

The new vat dyestuffs are prepared by condensing carboxylic acids of the general formula:

[X—A—X₁]—[COOH]ₙ wherein X, X₁, A and n have the above signification, or their functional derivatives, with amines of vattable ring systems. The carboxylic acid derivatives employed may contain any further substituents in their molecule, especially further azo and azoxy groups, and the amines of vattable ring systems used as second condensation component may also contain further substituents.

The new dyestuffs thus obtained dye vegetable fibers from the vat various shades of good fastness to chlorine and boiling and in many cases of excellent fastness to light.

It is a surprising fact that the new dyestuffs can be vatted by means of the usual reducing agents without splitting off the molecule by reducing the azo or azoxy groups which are present in the molecule.

In order to further illustrate our invention the following examples are given, the parts being by weight and all temperatures in degrees centigrade; but we wish it, however, to be understood that our invention is not limited to the examples given nor to the exact conditions stated therein.

Example 1

27 parts of azobenzene-4.4'-dicarboxylic acid are converted into the corresponding acid dichloride by means of 30 parts of thionylchloride in the presence of about 200 parts of o-dichlorobenzene. Then the excess of thionyl chloride is distilled off, the remaining solution of the azobenzene-4.4'-dicarboxylic acid dichloride is mixed at about 160° with the solution of 45 parts of of 1-aminoanthraquinone in about 400 parts of o-dichlorobenzene and the mixture is heated to boiling for about 3 hours in an apparatus provided with a reflux condenser. The condensation product formed of the formula:

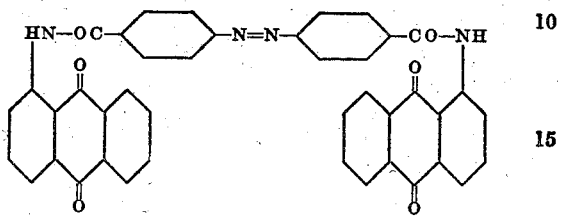

precipitates already while hot. It is a hardly soluble yellow powder which is filtered off and washed. The new dyestuff thus obtained is soluble in concentrated sulfuric acid with a brown-orange color and dyes cotton from a red vat fast greenish yellow shades.

Example 2

27 parts of azobenzene-4.4'-dicarboxylic acid are converted into the corresponding acid dichloride as described in Example 1. The acid dichloride obtained is condensed with 70 parts of 1-amino-5-benzoylaminoanthraquinone. The condensation product formed of the formula:

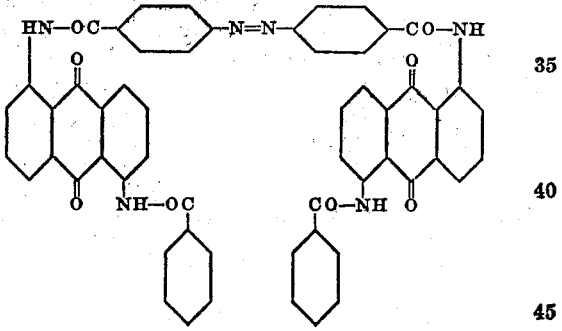

dissolves in concentrated sulfuric acid with an orange-brown color and dyes cotton from a dark red vat very fast yellow shades, especially of excellent fastness to light and weather.

Example 3

By employing 1-amino-4-benzoylaminoanthraquinone instead of 1-amino-5-benzoylaminoanthraquinone in Example 2 a condensation product of the formula:

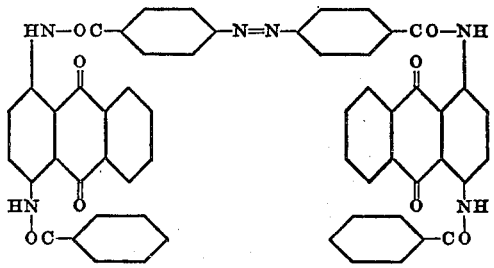

is obtained which dissolves in concentrated sulfuric acid with a brown-red color. It dyes cotton from a violet vat orange-red shades of very good fastness to light and chlorine.

Example 4

29 parts of azoxybenzene-4.4'-dicarboxylic acid are converted into the corresponding acid dichloride by boiling with 30 parts of thionyl chloride in about 200 parts of o-dichlorobenzene. Then the excess of thionyl chloride is distilled off, the remaining solution of the azoxybenzene-4.4'-dicarboxylic acid dichloride is mixed at about 160–180° with a solution of 70 parts of 1-amino-5-benzoylamino anthraquinone and the mixture is heated to boiling for some hours in an apparatus provided with a reflux condenser. The condensation product formed of the formula:

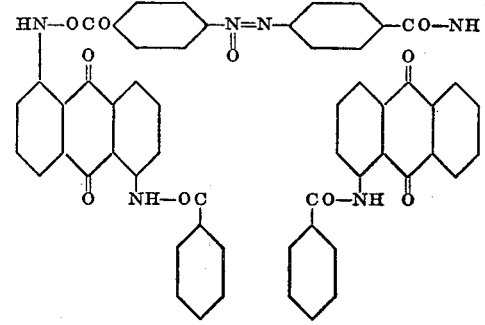

is filtered off and washed. It is soluble in concentrated sulfuric acid with an orange-red color and dyes cotton from a dark red vat very fast yellow shades which are identical with those obtained with the dyestuff prepared according to Example 2.

Example 5

When azobenzene-3.3'-dicarboxylic acid dichloride is condensed with 1-amino-5-benzoylaminoanthraquinone according to the method described in Example 2, a dyestuff is obtained of the formula:

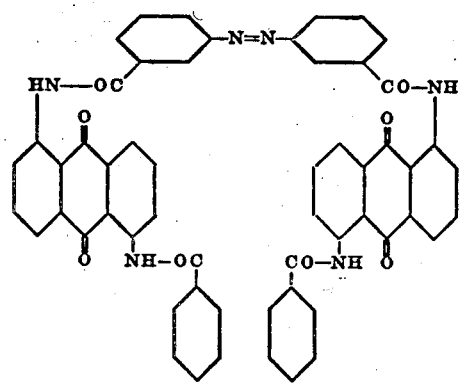

It is soluble in concentrated sulfuric acid with a brown color and dyes cotton from a dark red vat fast yellow shades.

Example 6

25 parts of 5-aminoanthrapyrimidine are condensed with 16 parts of azobenzene-4.4'-dicarboxylic acid dichloride by heating the two condensation components in o-dichlorobenzene to about 180–200° for some hours while stirring. The condensation product formed of the formula:

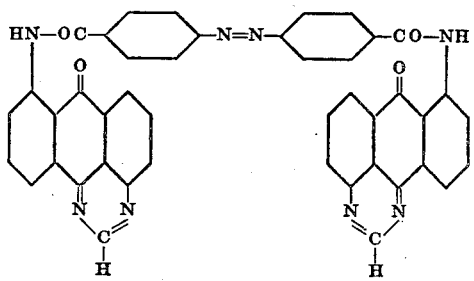

is filtered off while hot and washed. It is soluble in concentrated sulfuric acid with an orange-brown color and dyes cotton from a dark red vat fast yellow shades.

By employing 4-aminoanthrapyrimidine instead of 5-aminoanthrapyrimidine a similar vat dyestuff is obtained which yields more greenish yellow shades.

Example 7

37 parts of 4-amino-1,2-(2'-chlorophenyl-imidazole)-anthraquinone of the formula:

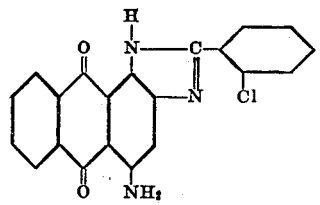

are condensed with 16 parts of azobenzene-4.4'-dicarboxylic acid dichloride by heating the two components in o-dichlorobenzene to boiling for me hours. The condensation product formed of the formula:

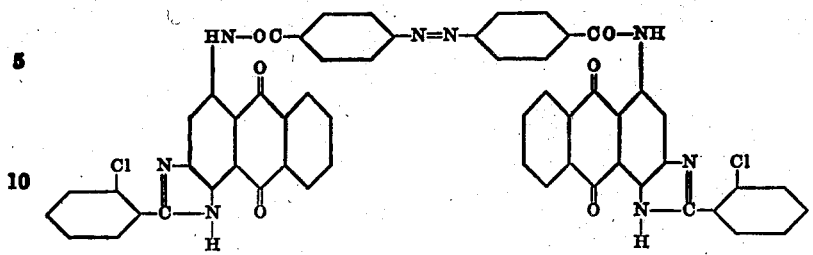

is soluble in concentrated sulfuric acid with a yellow-orange color and dyes cotton from a red vat yellow-orange shades of excellent fastness properties.

Example 8

25 parts of 1-amino-5-benzoylaminoanthraquinone are finely divided and condensed with 31 parts of azobenzene-4.4'-dicarboxylic acid dichloride in the presence of 10 parts of pyridine by stirring at about 40–50° for some hours. Then the mass is added to a solution of 35 parts of 1-amino-4-benzoylaminoanthraquinone in o-dichlorobenzene at about 160° and the mixture is heated to about 180° for 3 hours while stirring. The dyestuff formed of the formula:

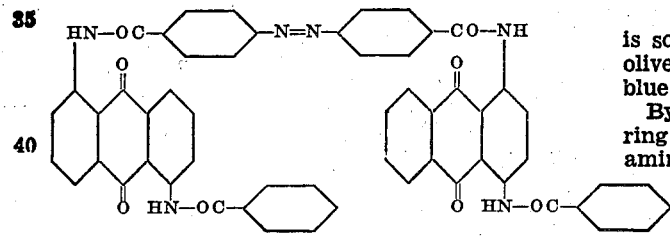

precipitates while hot. It dyes cotton from a red-violet vat orange shades of valuable fastness properties.

By employing 25 parts of 1-aminoanthraquinone instead of the 35 parts of 1-amino-4-benzoylaminoanthraquinone in the above example a similar vat dyestuff is obtained which yields fast yellow shades.

Example 9

9 parts of the condensation product of the formula:

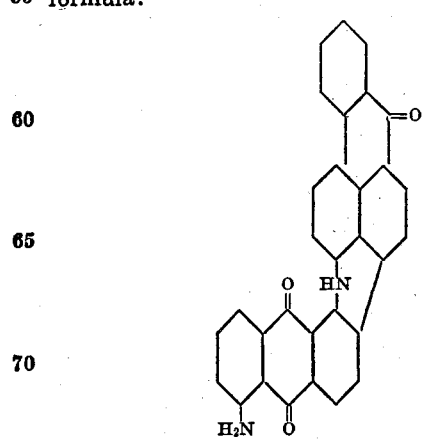

(confer U. S. Patent No. 1,850,562) are finely divided in nitrobenzene and condensed with 3.5 parts of azobenzene-4.4'-dicarboxylic acid dichloride by stirring at about 200–220° for some hours. The condensation product formed of the formula:

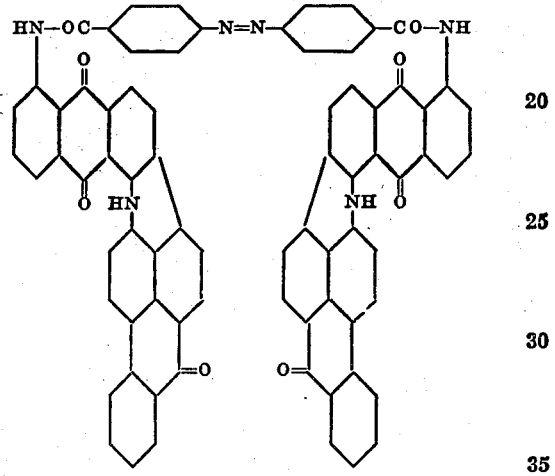

is soluble in concentrated sulfuric acid with an olive-green color and dyes cotton from a violet-blue vat very fast khaki shades.

By employing the amines of further vattable ring systems such as for example amines or diamines of the dibenzanthrone or anthanthrone series as condensation components, similar valuable vat dyestuffs are obtained.

Example 10

33 parts of 3.3'-dimethoxyazobenzene-4.4'-dicarboxylic acid (prepared by alkaline reduction of 2-methoxy-4-nitrobenzoic acid) are converted into the corresponding acid dichloride according to the method described in Example 1 by means of thionyl chloride in the presence of o-dichloro-benzene. The 3.3'-dimethoxyazobenzene-4.4'-dicarboxylic acid dichloride obtained is condensed with 70 parts of 1-amino-5-benzoylaminoanthraquinone. The condensation product formed of the formula:

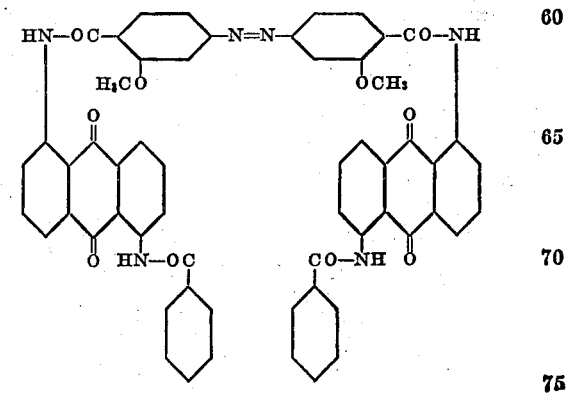

is soluble in concentrated sulfuric acid with a dark red color and dyes cotton from a red-violet vat very fast yellow shades.

Example 11

34 parts of 4-methoxyazobenzene-3',5'-dicarboxylic acid dichloride (prepared for example by diazotizing 5-amino-isophthalic acid, combining the diazo compound obtained with phenol, methylating the hydroxy group and converting the dicarboxylic acid into the acid dichloride by means of thionyl chloride, which substance crystallizes from benzine in yellow lamellae of 135° melting point) are condensed in o-dichlorobenzene with 70 parts of 1-amino-5-benzoylaminoanthraquinone. The dyestuff thus obtained of the formula:

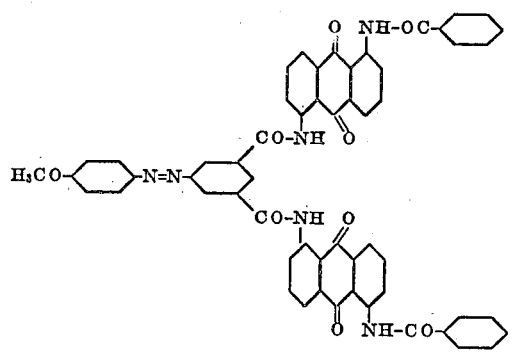

is soluble in concentrated sulfuric acid with an orange color and dyes cotton from a red-violet vat very fast yellow shades.

Example 12

37 parts of azobenzene-4,3',5'-tricarboxylic acid trichloride of 135° melting point are added to a solution of 67 parts of 1-aminoanthraquinone in about 700 parts of o-dichlorobenzene at about 160° and the mixture is stirred at this temperature for about 2 hours. Then the dyestuff formed of the formula:

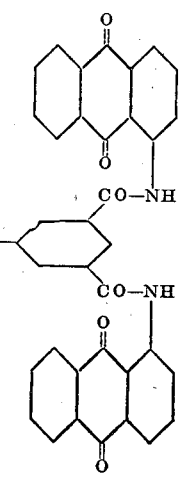

which is obtained with a very good yield, is filtered off, washed and dried. It is soluble in concentrated sulfuric acid with an orange-brown color and dyes cotton from a violet-red vat very fast greenish yellow shades.

The azobenzene-4,3',5'-tricarboxylic acid trichloride employed may be prepared for example by condensing the methylester of p-nitroso-benzoic acid with 5-amino-isophthalic acid in glacial acetic acid, saponifying the methylester group of the condensation product obtained in an alkaline medium and converting the tricarboxylic acid formed into the corresponding acid trichloride by means of phosphorus pentachloride in monochlorobenzene.

Example 13

43 parts of azobenzene-3,5,3',5'-tetracarboxylic acid tetrachloride of 133° melting point are added to a solution of 89 parts of 1-amino-anthraquinone in about 1000 parts of o-dichlorobenzene at about 160° and the mixture is stirred for about 2 hours at about 140–160°. The dyestuff formed of the formula:

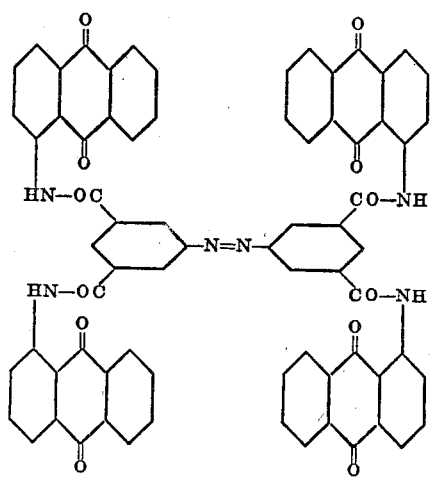

is filtered off when cool, washed and dried. It is soluble in concentrated sulfuric acid with an orange-brown color and dyes cotton from a dark red vat very fast greenish yellow shades.

The azobenzene-3,5,3',5'-tetracarboxylic acid tetrachloride employed may be prepared for example by reducing 5-nitro-isophthalic acid in an alkaline medium and converting the tetracarboxylic acid obtained into the corresponding acid tetrachloride by means of phosphorus pentachloride.

A dyestuff which yields dyeings identical with those of the above dyestuff is obtained by employing azoxybenzene-3,5,3',5'-tetracarboxylic acid tetrachloride instead of azobenzene-3,5,3',5'-tetracarboxylic acid tetrachloride. The azoxybenzene-3,5,3',5'-tetracarboxylic acid may be prepared for example by reducing 5-nitroisophthalic acid by means of sodium arsenite in an alkaline medium according to the method of Loesner (confer "Journal für praktische Chemie," vol. 50, page 365).

Example 14

46 parts of diphenylazodiphenyl-4.4'-dicarboxylic acid dichloride of the formula:

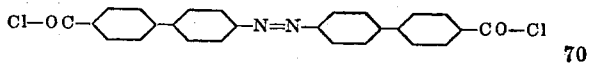

are slowly added to a solution of 46 parts of 1-aminoanthraquinone in about 500 parts of o-dichlorobenzene at about 160° and the mixture is stirred at this temperature for about one hour.

Then the condensation product formed of the formula:

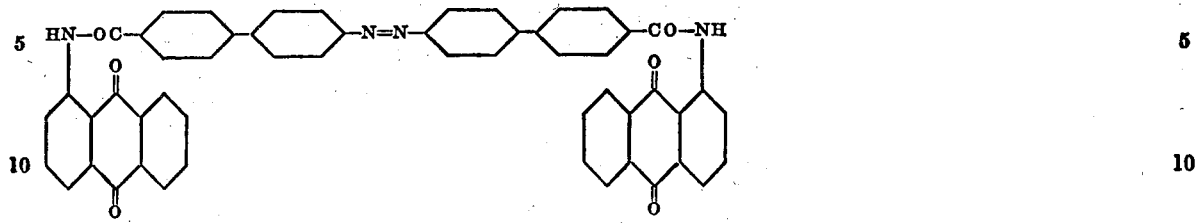

is filtered off, washed and dried. It is soluble in concentrated sulfuric acid with a brownish-red color and dyes cotton from a violet vat very fast yellow shades.

The diphenylazodiphenyl-4,4'-dicarboxylic acid dichloride employed for this example crystallizes in red needles of 250° melting point. It may be prepared for example by reducing 4-nitrodiphenyl-4'-carboxylic acid by means of grape sugar and converting the diphenylazodiphenyl-4,4'-dicarboxylic acid obtained into the corresponding acid dichloride by means of phosphorus pentachloride.

By employing instead of 1-aminoanthraquinone the corresponding amount of 1-amino-6-chloroanthraquinone as condensation component, a very similar vat dyestuff of likewise valuable fastness properties is obtained.

Example 15

By condensing 46 parts of diphenylazodiphenyl-4,4'-dicarboxylic acid dichloride with 69 parts of 1-amino-5-benzoylaminoanthraquinone according to the method described in Example 14, a vat dyestuff is obtained of the formula:

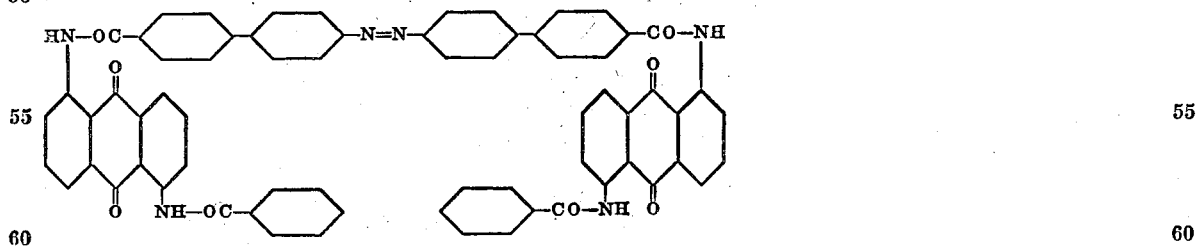

which is soluble in concentrated sulfuric acid with a red color. It dyes cotton from a violet vat yellow shades of excellent fastness properties.

By employing instead of 1-amino-5-benzoylaminoanthraquinone the same amount of 1-amino-4-benzoylaminoanthraquinone, a vat dyestuff is obtained which dissolves in concentrated sulfuric acid with a dark red color and dyes cotton from a violet vat valuable orange shades.

Example 16

24 parts of diphenylazoxydiphenyl-4,4'-dicarboxylic acid dichloride are slowly added to a solution of 35 parts of 1-amino-5-benzoylaminoanthraquinone in about 500 parts of monochlorobenzene at about 100–120° and the mixture is heated to boiling for about 1 hour while stirring in an apparatus provided with a reflux condenser. Then the dyestuff formed of the formula:

is filtered off, washed and dried. It is soluble in concentrated sulfuric acid with a dark red color and dyes cotton from a violet vat very fast yellow shades. The dyeings thus obtained are identical with those obtained with the dyestuff prepared according to Example 15.

The diphenylazoxydiphenyl-4,4'-dicarboxylic acid dichloride employed melts at 192°. It may be prepared for example by reducing 4-nitrodiphenyl-4'-carboxylic acid by means of grape sugar and converting the diphenylazoxydiphenyl-4,4'-dicarboxylic acid obtained into the corresponding acid dichloride by means of phosphorus pentachloride.

Example 17

49 parts of diphenyleneoxide-azo-diphenyleneoxide-2,2'-dicarboxylic acid dichloride of the formula:

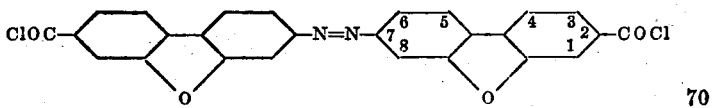

are slowly added to a solution of 70 parts of 1-amino-5-benzoylaminoanthraquinone in about 700 parts of o-chlorotoluene at about 140° and the mixture is heated to boiling for about 4 hours in an apparatus provided with a reflux condenser. Then the dyestuff formed of the formula:

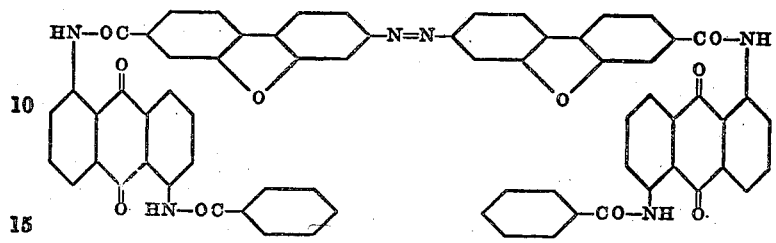

is filtered off, washed and dried. It is soluble in concentrated sulfuric acid with a violettish red color and dyes cotton from a violet vat very fast orange-yellow shades.

By employing 1-amino-4-benzoylaminoanthraquinone as condensation component a similar dyestuff is obtained. 1-aminoanthraquinone used as condensation component yields a vat dyestuff which dies cotton valuable yellow shades.

The diphenyleneoxide-azo-diphenyleneoxide-2,2'-dicarboxylic acid dichloride employed may be prepared for example by reducing 7-nitrodiphenyleneoxide-2-carboxylic acid by means of grape sugar and sodium hydroxide solution, and converting the diphenyleneoxide-azo-diphenylene-oxide-2,2'-dicarboxylic acid obtained into the corresponding acid dichloride by means of thionyl chloride. 7-nitrodiphenyleneoxide-2-carboxylic acid is prepared for example by nitrating diphenyleneoxide in a glacial acetic acid solution, condensing the nitro compound obtained with acetyl chloride and aluminiumchloride and oxidizing the aceto compound formed with an alkaline chlorine solution.

Similar valuable vat dyestuffs are obtained by employing instead of diphenyleneoxide-azo-diphenyleneoxide-dicarboxylic acid dichloride corresponding derivatives of the fluorene, carbazole and diphenylenesulfide series, such for example as the compounds corresponding to the following formulae:

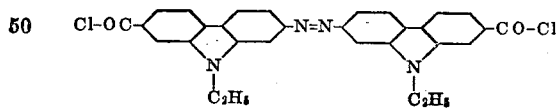

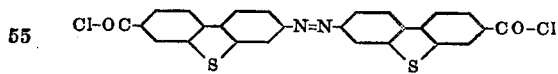

and

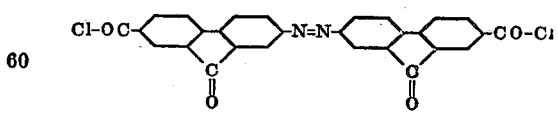

boxylic acid dichloride of 215° melting point are added to a solution of 35 parts of 1-amino-5-benzoylaminoanthraquinone in about 400 parts of trichlorobenzene at about 160–180°. The condensation product formed of the formula:

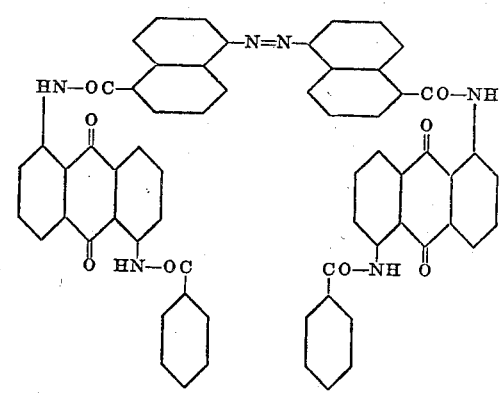

precipitates from the solution while hot after a short time. It is filtered off, washed and dried. The new dyestuff thus obtained is soluble in concentrated sulfuric acid with a brownish red color and dyes cotton from a red-violet vat very fast reddish yellow shades.

The 1,1'-azonaphthalene-5,5'-dicarboxylic acid dichloride employed may be prepared for example by reducing 5-nitronaphthalene-1-carboxylic acid by means of grape sugar in an alkaline medium, and converting the sodium salt of the 1,1'-azonaphthalene-5,5'-dicarboxylic acid obtained into the corresponding acid dichloride by means of thionyl chloride.

*Example 19*

29 parts of the dicarboxylic acid dichloride of the formula:

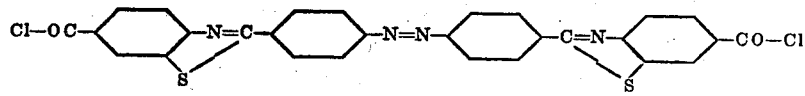

*Example 18*

20 parts of 1,1'-azonaphthalene-5,5'-dicarare condensed with 70 parts of 1-amino-5-benzoylaminoanthraquinone by boiling the two components in o-dichlorobenzene for some hours. The dyestuff formed of the formula:

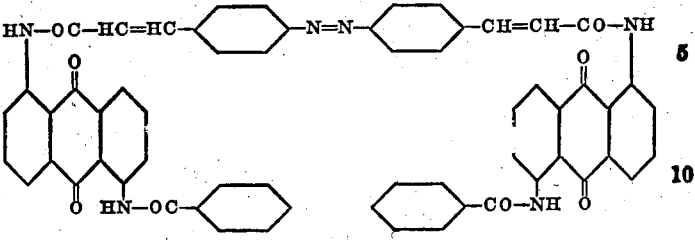

is soluble in concentrated sulfuric acid with an orange-brown color and dyes cotton from a violet vat greenish yellow shades of valuable fastness properties.

The dicarboxylic acid dichloride employed of the above formula crystallizes from o-dichlorobenzene in yellow needles melting above 300°. It may be prepared for example by reducing 2-(4'-nitrophenyl)-benzthiazole-6-carboxylic acid by means of grape sugar and converting the dicarboxylic acid obtained into the corresponding acid dichloride by means of phosphorus pentachloride.

*Example 20*

48 parts of amino-dibenzanthrone are finely divided in about 600 parts of trichloro-benzene and the suspension is stirred at about 180°. Then 18 parts of 3,3'-azocinnamic acid dichloride of the formula:

Cl—OC—HC=CH—⟨⟩—N=N—⟨⟩—CH=CH—CO—Cl are added and the mixture is stirred for about 3 hours at about 100°. The condensation product formed of the formula:

is filtered off while hot, washed and dried. It is soluble in concentrated sulfuric acid with a dark brown-red color and dyes cotton from a blue vat blue shades.

*Example 21*

18 parts of 4,4'-azocinnamic acid dichloride of the formula:

Cl-OC-HC=HC—⟨⟩—N=N—⟨⟩—CH=CH-CO-Cl are added to a solution of 35 parts of 1-amino-5-benzoylamino-anthraquinone in about 400 parts of monochlorobenzene and the mixture is heated to boiling for about 2–3 hours in an apparatus provided with a reflux condenser. The dyestuff formed of the formula:

precipitates already while hot and is filtered off, washed and dried. It dissolves in concentrated sulfuric acid with a red-brown color and dyes cotton from a violet vat orange shades of excellent fastness properties.

The 4,4'-azocinnamic acid dichloride employed crystallizes from benzene in yellow needles of 221° melting point. It may be prepared for example by reducing 4-nitrocinnamic acid by means of grape sugar in an alkaline solution and converting the 4,4'-azocinnamic acid obtained into the corresponding acid dichloride by means of thionyl chloride in a monochlorobenzene solution.

*Example 22*

18 parts of 4,4'-azophenoxyacetic acid dichloride of the formula:

Cl-OC-H₂CO—⟨⟩—N=N—⟨⟩—OCH₂-CO-Cl are condensed with 35 parts of 1-amino-5-benzoylaminoanthraquinone by heating the two components in o-dichlorobenzene at about 160–180° for some hours. The condensation product formed of the formula:

is filtered off when cool. It dissolves in concentrated sulfuric acid with an orange color and dyes cotton from a violettish red vat fast greenish yellow shades.

The 4,4'-azophenoxyacetic acid dichloride employed for this example crystallizes from benzine in flesh-colored needles of 125° melting point. It may be prepared for example by reducing 4-nitrophenoxyacetic acid by means of grape sugar in an alkaline solution and converting the 4,4'-azophenoxyacetic acid obtained into the corresponding acid dichloride by means of thionyl chloride in a monochlorobenzene solution.

*Example 23*

15 parts of 4,4'-azophenylacetic acid of the formula:

HOOC—H₂C—⟨⟩—N=N—⟨⟩—CH₂—COOH are boiled with an excess of thionyl chloride in o-dichlorobenzene, until the substance is wholly dissolved. Then the excess of thionyl chloride is distilled off, the remaining solution of the 4,4'-azophenylacetic acid dichloride formed is added to a solution of 35 parts of 1-amino-5-benzoylaminoanthraquinone in about 400 parts of o-dichlorobenzene at about 160° and the mixture is heated to this temperature for about 2 hours.

The condensation product formed of the formula:

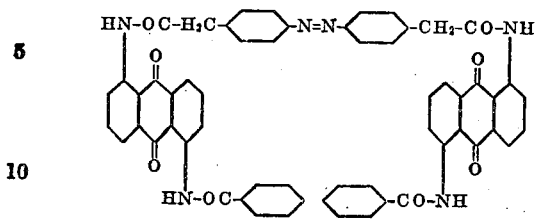

is filtered off when cool, washed and dried. It is soluble in concentrated sulfuric acid with a brown color and dyes cotton from a dark red vat fast yellow shades.

Example 24

By condensing 1 molecular weight of benzidine with 2 molecular weights of the methyl ester of 4-nitrosobenzoic acid, saponifying the condensation product formed and treating it with phosphorus pentachloride, a dicarboxylic acid dichloride is obtained which crystallizes in orange-yellow prisms of 235° melting point and corresponds to the formula:

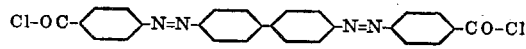

48 parts of this compound are slowly added while stirring at about 160° to a solution of 45 parts of 1-aminoanthraquinone in about 500 parts of o-dichlorobenzene. The mixture is stirred for about 2 hours at about 200° and the condensation product formed of the formula:

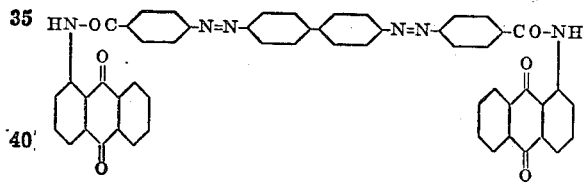

is filtered off when cool. It is soluble in concentrated sulfuric acid with a red-violet color and dyes cotton from a dark red-violet vat yellow shades of excellent fastness properties.

Example 25

By condensing 1 molecular weight of 4,4'-diamino-azo-benzene with 2 molecular weights of the methyl ester of 4-nitroso-benzoic acid, saponifying the condensation product formed and treating it with phosphorus pentachloride, a dicarboxylic acid dichloride is obtained which crystallizes from monochlorobenzene in orange-yellow lamellae melting above 300° and corresponds to the formula:

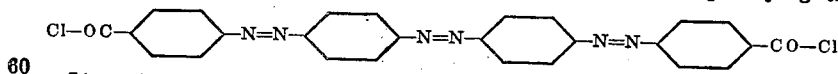

51 parts of this compound are condensed with 69 parts of 1-amino-5-benzoylaminoanthraquinone in about 700 parts of o-dichloro-benzene according to the method described in Example 24. The condensation product formed of the formula:

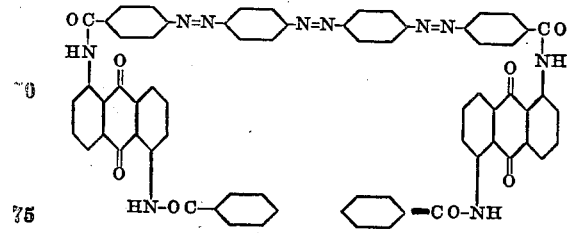

is filtered off at about 100°, washed and dried. It is soluble in concentrated sulfuric acid with a red-violet color and dyes cotton from a violet vat orange-yellow shades of very good fastness properties.

Example 26

By condensing 1 molecular weight of 4,4'-diamino-benzophenone with 2 molecular weights of the methyl ester of 4-nitrosobenzoic acid, saponifying the condensation product obtained and treating it with phosphorus pentachloride, a di-carboxylic acid dichloride is obtained which crystallizes from monochlorobenzene in flesh-colored needles of 242° melting point and corresponds to the formula:

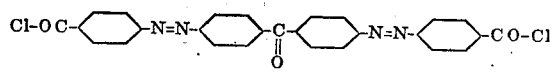

51 parts of this compound are condensed with 69 parts of 1-amino-5-benzoylaminoanthraquinone according to the method described in Example 25. The condensation product formed of the formula:

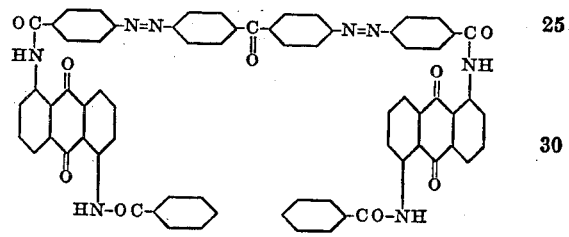

is soluble in concentrated sulfuric acid with a brown-orange color and dyes cotton from a violet vat reddish yellow shades of excellent fastness properties.

By starting from the dicarboxylic acid dichloride of the corresponding azoxy compound which is obtainable for example from the above azo-compound by oxidation with hydrogen peroxide, a yellow vat dyestuff is obtained dyeing cotton from the vat reddish yellow shades which are identical with those obtained by means of the above dyestuff. Similar vat dyestuffs are obtained by employing the methyl ester of 3-nitrosobenzoic acid instead of the methyl ester of 4-nitrosobenzoic acid for the manufacture of the dicarboxylic acid dichloride used as condensation component.

Example 27

By condensing 1 molecular weight of 4,4',4"-triamino-triphenylmethane with 3 molecular weights of the methyl ester of 4-nitrosobenzoic acid, saponifying the condensation product obtained and treating it with phosphorus pentachloride, a tricarboxylic acid trichloride is obtained which crystallizes from benzine in orange needles of 215° melting point and corresponds to the formula:

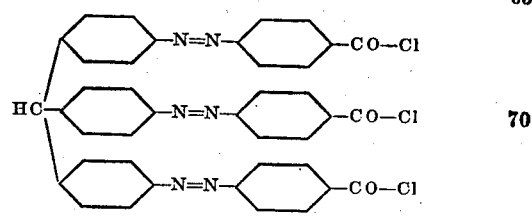

1 molecular weight of this compound is condensed with 3 molecular weights of 1-amino-5-benzoylaminoanthraquinone according to the method described in Example 25. The condensation product formed of the formula:

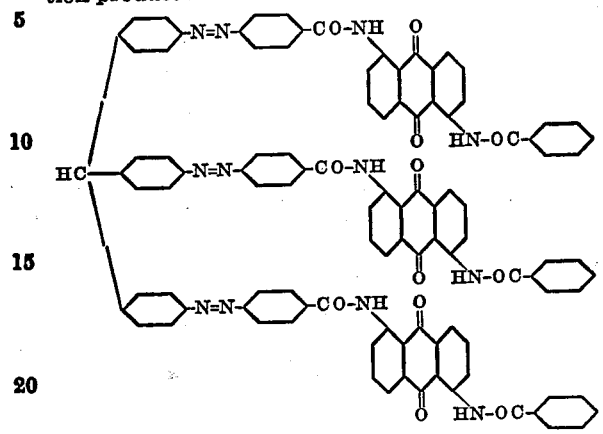

is soluble in concentrated sulfuric acid with a brown color and dyes cotton from a violet vat orange-yellow shades of very good fastness properties.

We claim:

1. The vat dyestuffs of the general formula:

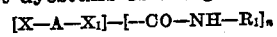

wherein X and $X_1$ stand for members selected from the group consisting of the radicles of the benzene, naphthalene, diphenyl, fluorine, diphenylene oxide, diphenylene sulfide, carbazole and benzthiazole series, A stands for a member selected from the group consisting of the azo and azoxy group, $R_1$ stands for a radicle of a vattable ring system containing an anthraquinone radicle and $n$ stands for one of the numbers 2 to 4, which dyestuffs dye vegetable fibers from the vat various shades of good fastness to chlorine and boiling and in many cases of excellent fastness to light.

2. The vat dyestuff of the formula:

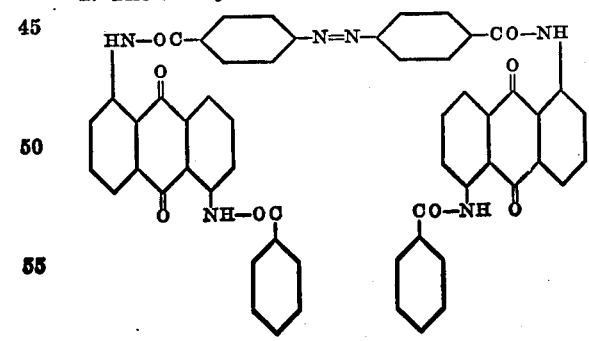

which dyestuff is soluble in concentrated sulfuric acid with an orange-brown color and dyes cotton from a dark red vat very fast yellow shades, especially of an excellent fastness to light and weather.

3. The vat dyestuff of the formula:

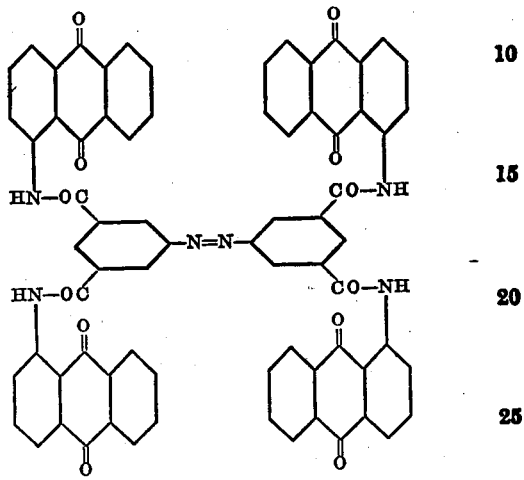

which dyestuff is soluble in concentrated sulfuric acid with an orange-brown color and dyes cotton from a dark red vat very fast greenish yellow shades.

4. The vat dyestuff of the formula:

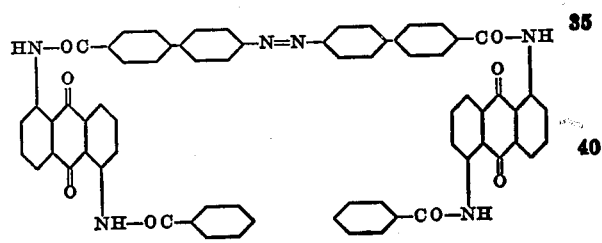

which dyestuff is soluble in concentrated sulfuric acid with a red color and dyes cotton from a violet vat yellow shades of excellent fastness properties.

ERNST HONOLD.
MAX SCHUBERT.